United States Patent
Zamir et al.

(10) Patent No.: US 12,124,288 B2
(45) Date of Patent: Oct. 22, 2024

(54) STORAGE DEVICE THROTTLING IN PROOF OF SPACE BLOCKCHAIN SYSTEMS

(71) Applicant: Western Digital Technologies, Inc., San Jose, CA (US)

(72) Inventors: Ran Zamir, Ramat Gan (IL); David Avraham, Even Yehuda (IL); Alexander Bazarsky, Holon (IL)

(73) Assignee: Western Digital Technologies, Inc., San Jose, CA (US)

( * ) Notice: Subject to any disclaimer, the term of this patent is extended or adjusted under 35 U.S.C. 154(b) by 269 days.

(21) Appl. No.: 17/584,097

(22) Filed: Jan. 25, 2022

(65) Prior Publication Data

US 2023/0288952 A1   Sep. 14, 2023

(51) Int. Cl.
*G06F 3/06* (2006.01)
*G06F 1/08* (2006.01)

(52) U.S. Cl.
CPC ............. *G06F 1/08* (2013.01); *G06F 3/0604* (2013.01); *G06F 3/064* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 10,957,416 | B2* | 3/2021 | Harms | G11C 29/52 |
| 11,360,946 | B2* | 6/2022 | Hintermeister | G06Q 20/02 |
| 2018/0046231 | A1* | 2/2018 | Raghu | G06F 1/3275 |
| 2019/0278506 | A1 | 9/2019 | Richardson | |
| 2021/0083876 | A1 | 3/2021 | Harms | |
| 2021/0318803 | A1* | 10/2021 | Zhu | H04L 67/1097 |
| 2023/0244386 | A1* | 8/2023 | Steinmetz | G06F 3/0655 711/154 |
| 2023/0244394 | A1* | 8/2023 | Bert | G06F 3/0659 711/154 |

OTHER PUBLICATIONS

"Proof of Space," Wikipedia, Retrieved from Internet URL:https://en.wikipedia.org/wiki/Proof_of_space, last edited on Jan. 17, 2022, pp. 3 (Jan. 17, 2022).
Suhler, P., and Carlson, M., "Managing Capacity in NVM Express SSDs", Storage Developer Conference, Santa Clara, CA, pp. 1-18, (Sep. 23-26, 2019).

\* cited by examiner

*Primary Examiner* — Elias Mamo
(74) *Attorney, Agent, or Firm* — Ravi Mohan; Rutan & Tucker, LLP

(57) ABSTRACT

Storage devices are configured to be utilized in a variety of blockchain related activities that rely on a proof of space consensus model. These storage devices are required to process a lot of read and write cycles on their memory devices to generate the desired proof of space consensus data. The generation and storing of this generated data require very different types of memory device usage. As these operations increase in popularity, the need to segment storage devices meant for proof of space usage and those which are not becomes more important. Storage devices may be configured to throttle these different usage types upon detecting these proof of space blockchain activities. Throttling may include reducing clock frequencies, selecting slower performing trim parameters, and programming memory devices with a reduced voltage window, among other processes. Detecting whether throttling should commence, or end can be done via a deployed machine learning classifier.

10 Claims, 11 Drawing Sheets

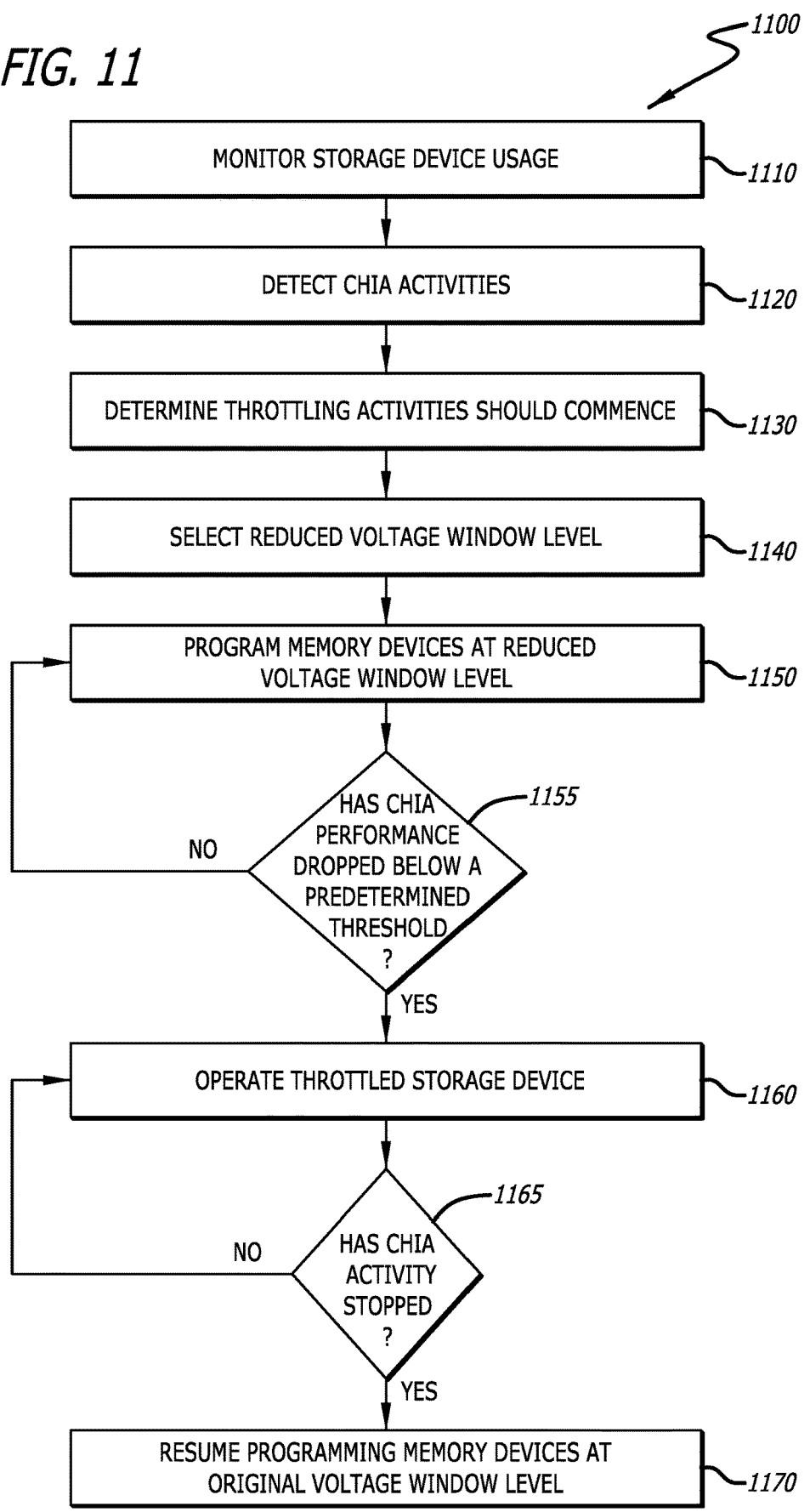

STORAGE DEVICE THROTTLING IN PROOF OF SPACE BLOCKCHAIN SYSTEMS

FIELD

The present disclosure relates to storage systems. More particularly, the present disclosure relates to throttling storage device settings and processes in systems utilized for proof of space blockchain applications.

BACKGROUND

Storage devices are ubiquitous within computing systems. Recently, solid-state storage devices (SSDs) have become increasingly common. These nonvolatile storage devices can communicate and utilize various protocols including non-volatile memory express (NVMe), and peripheral component interconnect express (PCIe) to reduce processing overhead and increase efficiency.

The increased write and read speeds of SSDs have made them an attractive choice for an increasing number of applications. Once of these applications is for the generation of data for blockchain operations. Traditional blockchain processes utilize a proof of work method to generate consensus across a network. However, this process is becoming increasingly criticized for the increased demand being placed on computer central processing units (CPUs) and graphical processing units (GPUs) which are required to generate the proof of work data. This increased demand has led to a shortage of these parts as well as increased the overall use of electricity, contributing to electrical waste.

In response, a series of blockchain systems have been implemented that utilize a proof of space consensus method. Instead of generating calculations in CPUs and GPUs, a series of specialized data is stored within a storage device. This data is then recalled by the network to form a consensus model. Thus, storage device space is the commodity utilized instead of CPUs and GPUs. The generation of the data for these proof of space methods requires a lot of processing read and write cycles which creates a higher demand for the faster processing capabilities of SSDs. However, once generated, the resultant data can be stored elsewhere and only needs to be accessed relatively infrequently.

Similar to the graphics card market that has been negatively affected by supply chain constraints, storage devices may increase in popularity beyond a desired point. Storage device makers may want to segment their products such that only particular storage devices are meant to be used for proof of space blockchain activities. However, bad faith blockchain miners may attempt to circumvent this segmentation and utilize general use storage drives for proof of space blockchain activities, thus negatively affecting the market.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 11 is a flowchart depicting a process for throttling proof of space blockchain activities by programming memory devices with a reduced voltage window in accordance with an embodiment of the disclosure.

Figure 1:
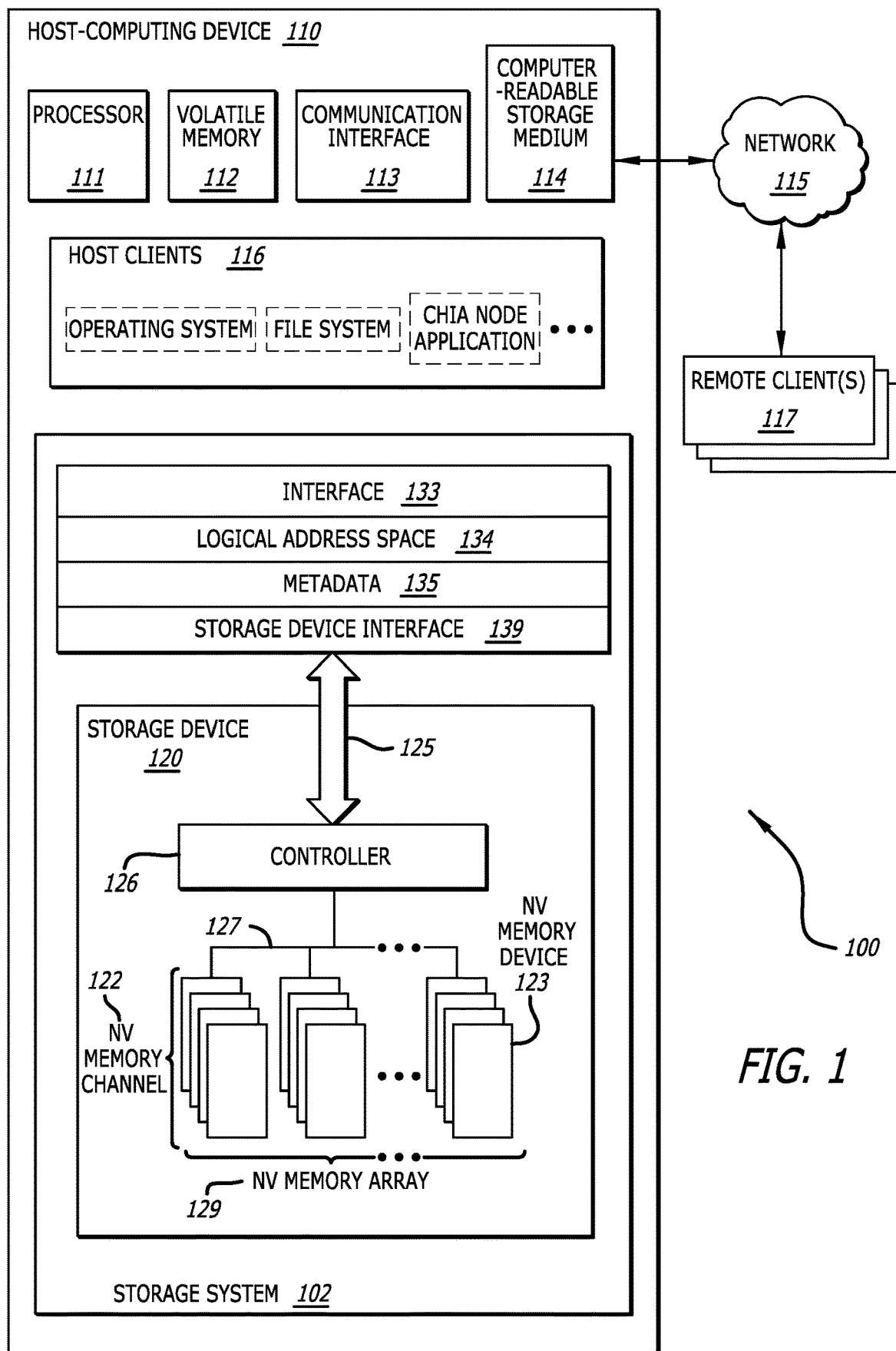
FIG. 1 is a schematic block diagram of a host-computing device with a storage device suitable for proof of space memory array throttling in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that provide for throttling of storage devices upon detection or signaling of proof of space blockchain activities. More specifically, many embodiments can reduce clock frequencies, select slower trim parameters, program memory devices within a reduced voltage window, reducing cache sizes, along with disabling other performance enhancing features. By performing these throttling operations, the latency or overall speed/performance of the storage device can be reduced. Additionally, certain throttling operations can help offset the proof of space blockchain activity wear of the memory devices.

In a number of embodiments, the storage device can utilize a machine learning classifier to determine if proof of space blockchain activities are being performed on the storage device, or if the determined activities exceed a predetermined threshold such that throttling processes should be performed. Other vendor specific commands, namespace identifiers, or various attributes such as read and write patterns can be analyzed to determine if proof of space blockchain activity is present and/or should be throttled.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device with a storage device suitable for proof of space memory device throttling in accordance with an embodiment of the disclosure is shown. The proof of space consensus blockchain system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise a computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like. In many embodiments, the host client will be a proof of space blockchain logic that can make the host-computing device 110 act as a node within a proof of space consensus blockchain network. The embodiments depicted in FIG. 1 comprises a Chia node application host client. This embodiment may thus be configured to act as a Chia node on the Chia blockchain network.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations. As those skilled in the art will recognize, the number of, and location of the storage devices may change as needed. For example, in Chia node applications, the number of storage devices may increase as additional plots are created and set up for access during farming operations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). In many embodiments, the remote clients 117 will be comprised of other proof of space consensus nodes within that respective blockchain network. For example, in the embodiment depicted in FIG. 1, the remote clients 117 may comprise other Chia nodes and/or timelords within the Chia network. The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
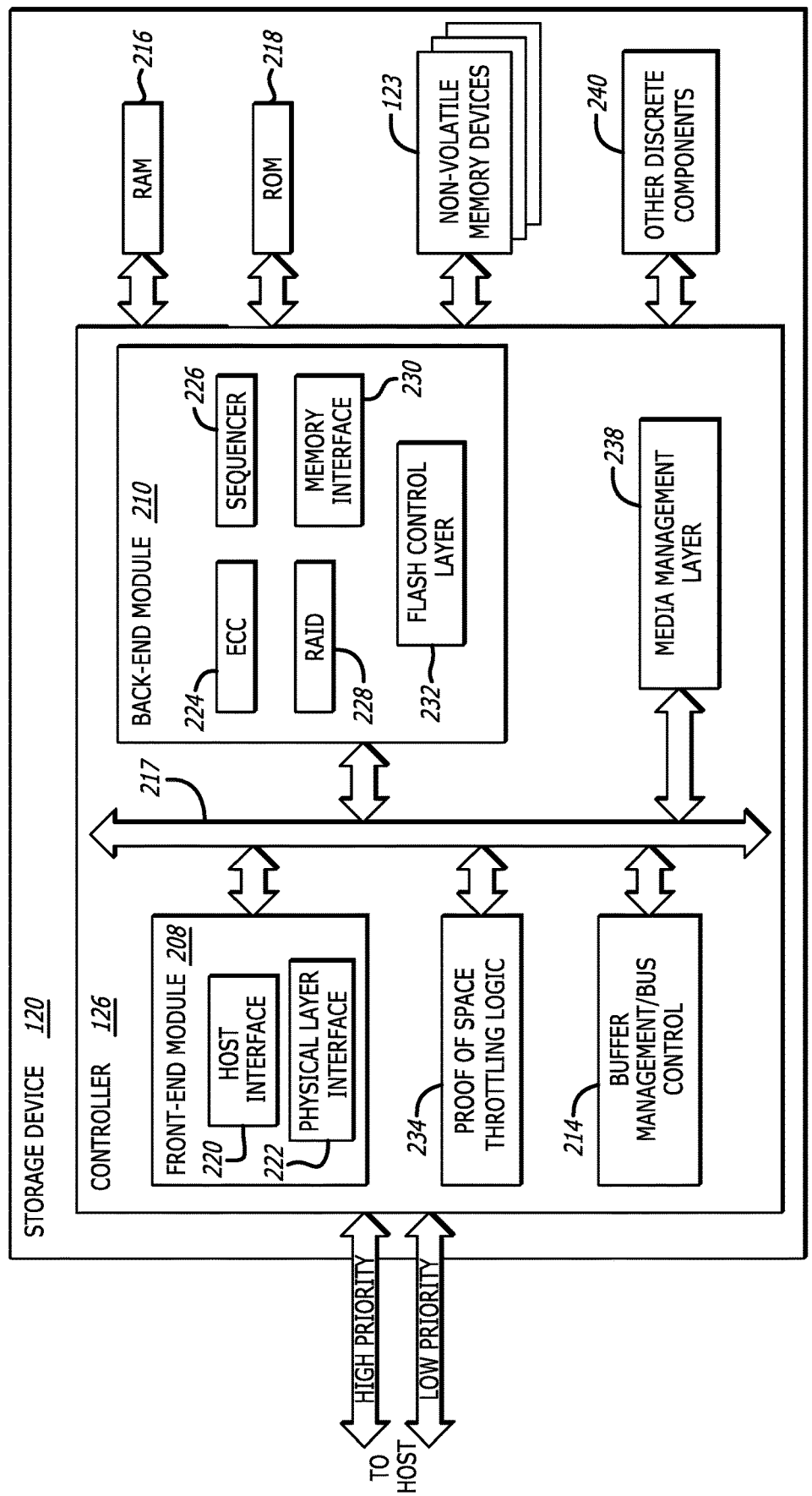
FIG. 2 is a schematic block diagram of a storage device suitable for proof of space memory array throttling in accordance with an embodiment of the disclosure.

Referring to FIG. 2, a schematic block diagram of a storage device suitable for proof of space memory array throttling in accordance with an embodiment of the disclosure is shown. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a proof of space throttling logic 234. In many embodiments, the proof of space throttling logic 234 can be configured to monitor data usage, received host commands, and partition conditions within the storage device 120. This monitoring can help determine if proof of space blockchain activities are occurring within the memory array. Additionally, the proof of space throttling logic 234 can be configured to receive and process commands received from the host-computing device such as, but not limited to, vendor specific commands that can also indicate the presence of or upcoming presence of proof of space blockchain activities. In additional embodiments, the proof of space throttling logic 234 can also modify or throttle the behavior of memory device operations including reducing clock frequencies, utilizing slower trim parameters, programming with a reduced voltage window, reducing available cache sizes, as well as disabling other performance enhancing features.

In yet further embodiments, the proof of space throttling logic 234 can employ one or more machine learning classifiers to determine if proof of space blockchain activities are being performed on the storage device, or if the determined activities exceed a predetermined threshold such that throttling processes should be performed. This machine learning classifier may also be utilized across a storage device network to analyze activities on other storage devices. In this way, a storage device that is not configured with a machine learning classifier can be notified or otherwise receive messages that throttling should occur within the storage device, even if the storage device was not originally configured for proof of space blockchain activity throttling.

Figure 3:
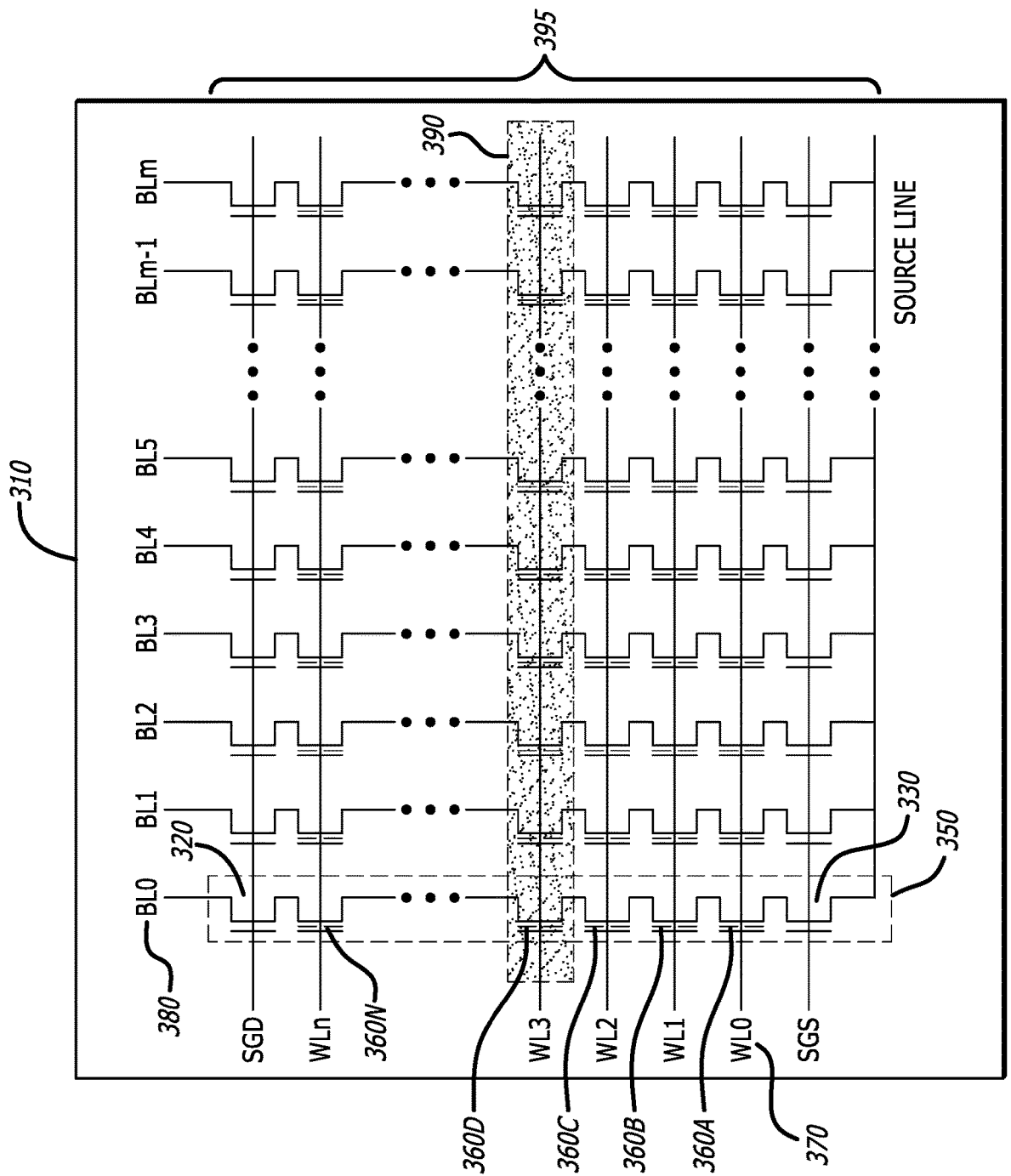
FIG. 3 is a conceptual schematic diagram of a two-dimensional memory array in accordance with an embodiment of the disclosure.

Referring to FIG. 3, a conceptual schematic diagram of a two-dimensional memory array 310 in accordance with an embodiment of the invention is shown. Memory devices, such as those depicted in FIGS. 1 and 2, may be arranged in two or three dimensions, such as a two-dimensional memory array or a three-dimensional memory array. FIG. 3 is a schematic diagram of one example of a two-dimensional memory array 310, such as a 2D or planar NAND memory array. The two-dimensional memory array 310 includes a set of NAND strings 350. Each NAND string 350 comprises a memory cells 360A, 360B, 360C, 360D to 360N. Each NAND string 350 includes a select gate drain transistor (SGD) 320 and a select gate source transistor (SGS) 330. The two-dimensional memory array 310 includes multiple pages 390. Page 390 is accessed by the control gates of the cells of the page connected in common to a word line 370 and each cell accessible via bit lines 380. In other embodiments, the memory cells may be arranged in other configurations. The sum of these groups of pages is considered a block 395. The memory block 395 can also be further arranged and configured with other memory blocks to generate larger memory structures as described in more detail below.

These memory blocks also typically have a finite lifespan, meaning that they will eventually fail over time. Specifically, each time the memory cell is written to, and erased, it may be harder to hold a proper charge such that a particular (and correct) piece of data may be retrieved from the cell. Thus, data storage manufacturer's configure various methods on storage devices to make sure wear within the storage device is spread across all blocks and memory devices somewhat equally to increase their overall endurance. Eventually though, there may be a point where it is not possible to reliably store data within the memory cell. These errors contribute to an overall bit error rate ("BER") that lead to a reduced lifespan of the storage device. Various embodiments described herein can attempt to increase the endurance of the memory devices by performing one or more throttling operations that are suited to discourage the data usage patterns of proof of space blockchain activities, such as those seen in Chia plotting.

Figure 4:
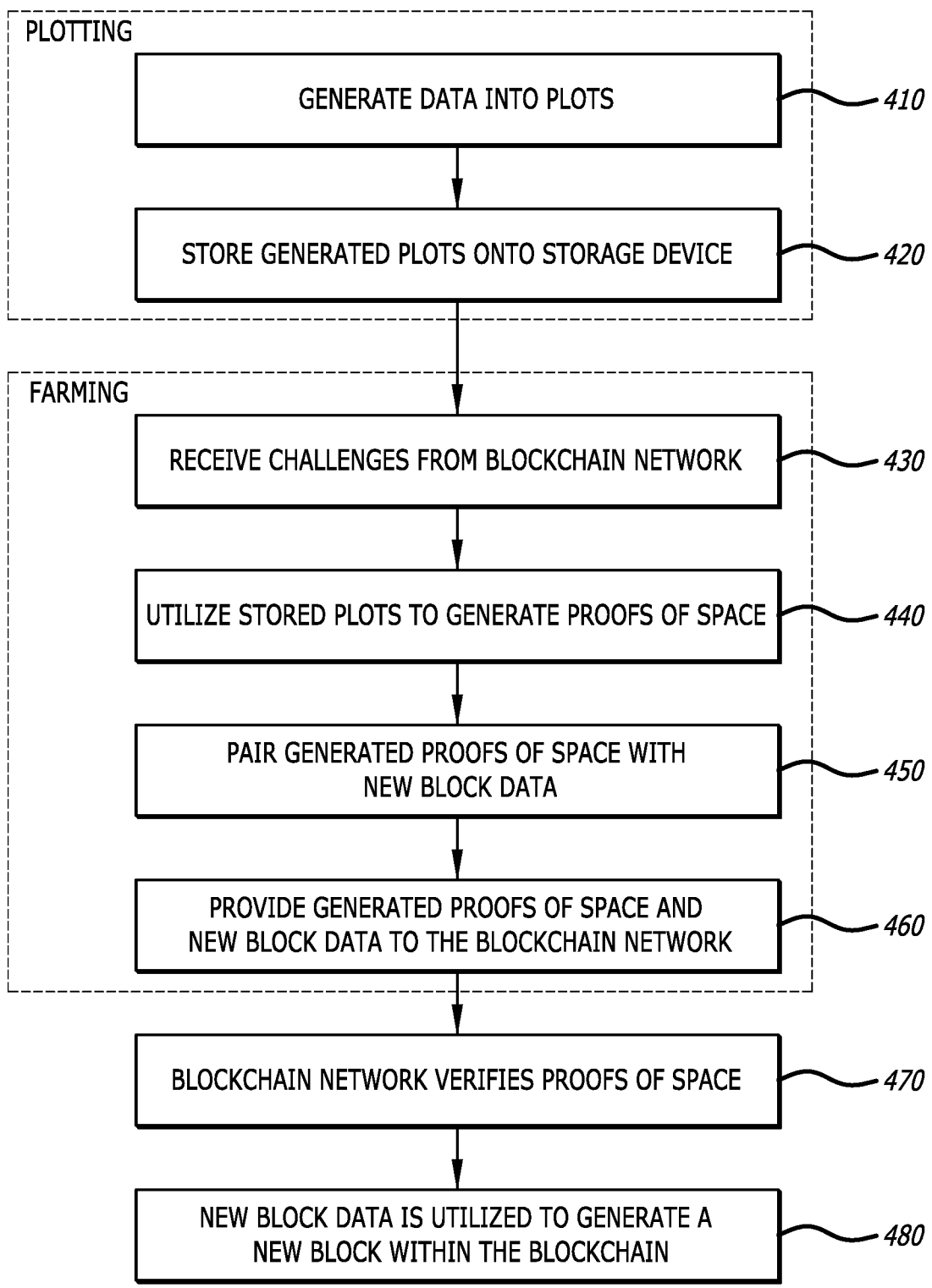
FIG. 4 is a flowchart depicting a process for mining cryptocurrency utilizing a proof of space consensus method in accordance with an embodiment of the disclosure.

Referring to FIG. 4, a flowchart depicting a process 400 for mining cryptocurrency utilizing a proof of space consensus method is shown. As discussed above, the mining of cryptocurrency can come in many forms. In a growing number of applications, cryptocurrency that uses a consensus method of proof of space can be utilized as an alternative to the currently more popular proof of work method. One example of a blockchain-based cryptocurrency that utilizes proof of space as a consensus method is Chia. Chia is centered on creating (i.e., "plotting") large quantities of proof of space consensus data that is formatted into one or more "plots." These plots are then stored on a storage devices for future accessing by the online Chia blockchain network. The plots comprise a series of hashed tables which may be accessed by the farmer in response to a challenge posed by the network. This process of storing the plots and providing them to the online Chia network for challenge processing is called "farming."

In a typical proof of space blockchain process 400 the plotting stage can begin by generating plots (block 410). In various embodiments, the plot data is generated according to a given seed value. Although Chia utilizes plots, some embodiments may be able to be formatted for use within other proof of space-based blockchain-based systems. In many embodiments, the generation of plot data involves the creation of a plurality of tables comprising cryptographic hashes that may be nested, self-referential, or otherwise related. In various embodiments, the hashes created through a back propagation method and are then sorted and compressed throughout the tables. The plots are completed and stored onto a storage device (block 420). This generation of plots creates a lot of input and output processes within the storage device and benefits from high-speed storage devices. This results in many users utilizing SSDs for plotting operations. However, the nature of many SSDs and their relative increased costs and finite endurance leads to many users copying the generated plots to a secondary storage device that is more configured for long-term storage.

The farming stage of proof of space consensus blockchain system comprises all of the remaining steps. Farming can begin by receiving one or more challenges from the blockchain network (block 430). The exact type of challenge may vary based on the cryptocurrency process used. For example, the challenge may be a problem that must be solved within a certain time and/or in a particular format. The process 400 can utilize the stored plots to generate proofs of space (block 440). These proofs of space are required of the challenge answers that allow the user to attempt to add their contribution to the blockchain and reap a reward. In a variety of embodiments, the generated proofs of space are paired with new block data (block 450). New block data can include a proposed data block to add to the blockchain. Those skilled in the art will understand that this new block data may be comprised of sub-blocks or any other proposed block data as required by the blockchain being utilized.

The paired proofs of space and new block data is transmitted onto the blockchain network (block 460). The transmitted data is not automatically added to the blockchain but needs to satisfy one or more requirements as more than one user on the network may have submitted a valid proof to the challenge. During the selection of a potential new block, the blockchain network will verify the submitted proofs of space (block 470). This can be done in a variety of ways depending on the exact blockchain used. Once the blockchain network has settled on a particular block candidate that was submitted, the new block data is utilized to generate a new block within the blockchain (block 480).

Figure 5:
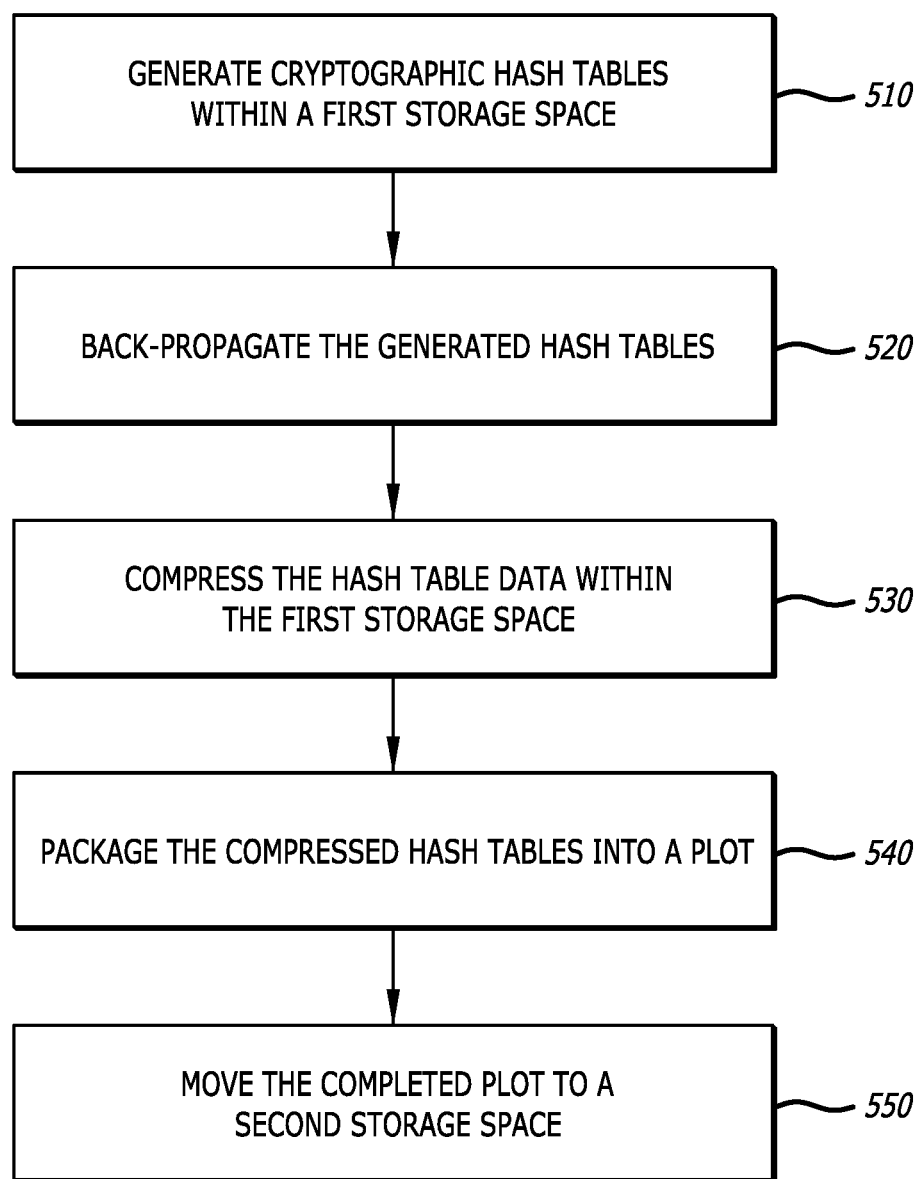
FIG. 5 is a flowchart depicting a process for processing and storing a plot of data associated with a proof of space consensus method in accordance with an embodiment of the disclosure.

Referring to FIG. 5, a flowchart depicting a process 500 for processing and storing a plot of data associated with a proof of space consensus method is shown. In many embodiments, the plotting may be done by a Chia-based client application. The Chia-client, such as a Chia node application, may begin the process 500 by generating a plurality of cryptographic hash tables within a first storage space (block 510). The user of the Chia-client may have configured the first storage space as a high-speed storage space or at least a high-speed partition within the storage device.

In a variety of embodiments, once the cryptographic hash tables have been generated, they may be back-propagated through the tables (block 520). This process may involve a number of calculations and require a significant amount of time and/or input and output resources to process. In further embodiments, this hash table data can be compressed within the first, high-speed storage space (block 530). These compressed hash tables can be formatted into a compressed single package, which may be dubbed a "plot" (block 540). For example, in Chia, the size of a plot may exceed one-hundred gigabytes in size. Upon completion of the plot packaging, the process 500 can facilitate transfer of the completed plot to a second storage space which is typically configured to longer-term storage (block 550). This process of generating and storing plots of data for farming can create a unique set of demands for storage devices. As such, embodiments discussed below attempt to discourage or throttle this type of usage of the memory array and other storage device operations.

Figure 6:
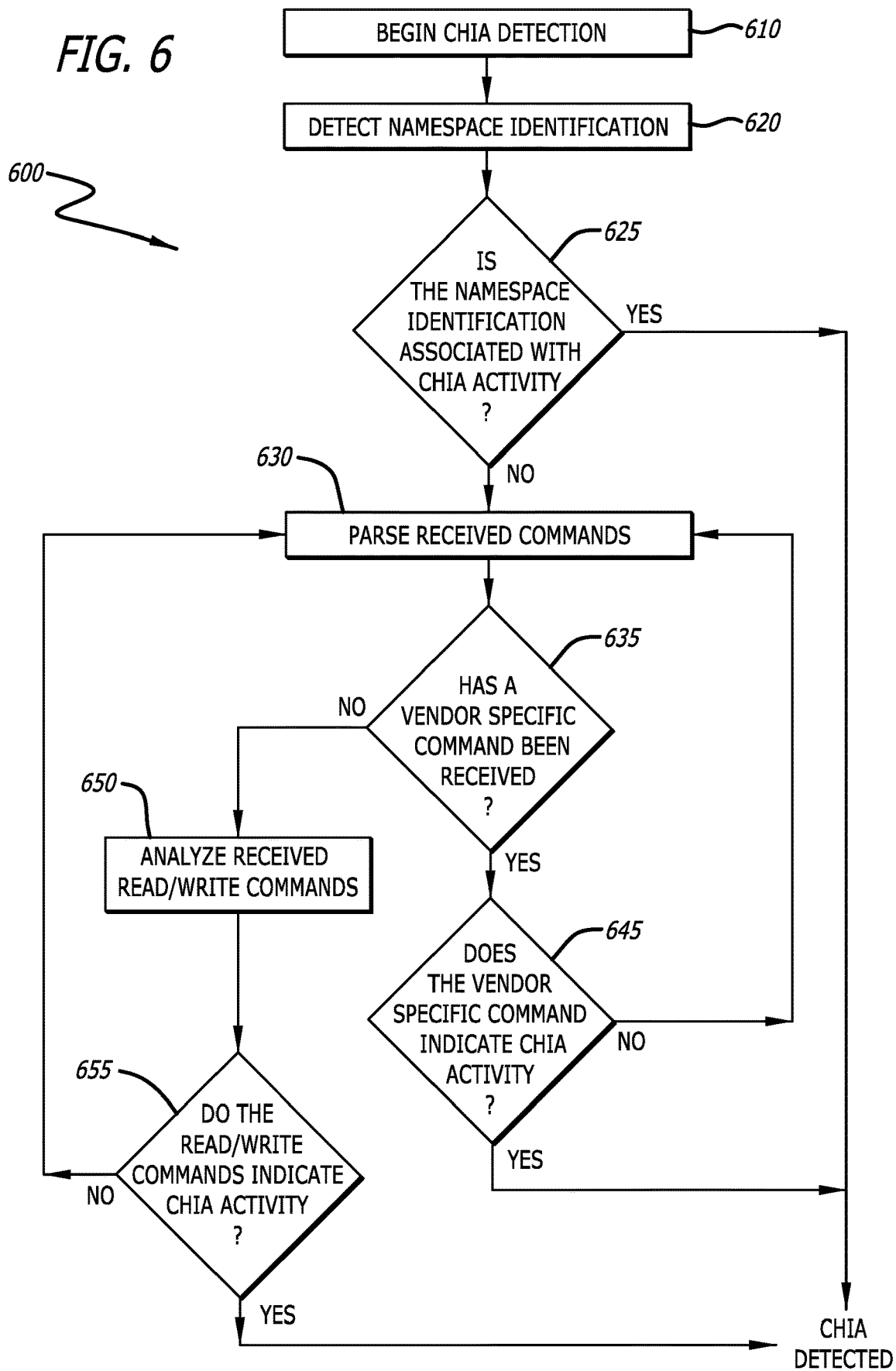
FIG. 6 is a flowchart depicting a process for detecting the use of proof of space blockchain activities within a storage device in accordance with an embodiment of the disclosure.

Referring to FIG. 6, a flowchart depicting a process 600 for detecting the use of proof of space blockchain activities within a storage device in accordance with an embodiment of the disclosure is shown. As described in more detail within subsequent figures, many embodiments can utilize and enact various measures to throttle the use of the memory devices within the memory array of the storage device upon detection of certain proof of space blockchain activities. Detection of these activities then is thus crucial to these throttling operations. Although the embodiment depicted in FIG. 6 is directed to Chia blockchain activities, it will be understood by those skilled in the art that these embodiments may be utilized by any proof of space-based blockchain operations.

The process 600 can begin by enabling the Chia detection process (block 610). The specific steps utilized to detect Chia activities may vary based on the storage device and can be done over multiple steps and/or methods. In the embodiment depicted in FIG. 6, the process 600 can first detect a namespace identification (block 620). Often, namespace identifications can be associated with specific types of activities. These associations may be within a particular standard, but often they are vendor specific and may be preprogrammed during storage device manufacturing. The process can analyze the detected namespace identification and determine if it is associated with Chia activity (block 625). For example, a specific namespace identification number or data may match to a predetermined item that indicates that the particular namespace should be configured for Chia or other proof of space blockchain activities. If the namespace identification is associated with such activity, then the process 600 can indicate that for further processing.

The process 600 may further parse received commands, such as those from a host-computing device (block 630). The storage device will receive various commands over time directing it to store, read, and otherwise process data. Those commands can be analyzed to determine if a vendor specific command has been given (block 635). As those skilled in the art will recognize, vendor specific commands can be commands issued to the storage device that aren't specifically defined within the usual communication specification/protocol. These vendor specific commands can be utilized and sent by the host to communicate unique actions, data, or other signals, which can often be utilized to direct the storage device to act in a particular manner.

The process 600 can determine if a received vendor specific command indicates that Chia activity is occurring (block 645). For example, a vendor may preconfigure a storage device to process a specific type of vendor specific command to indicate that a particular memory array, namespace, or other partition should be configured or otherwise processed for proof of space blockchain activities. When the vendor specific command matches this preconfigured data, the process 600 can act accordingly to indicate that Chia activities are detected.

However, even without the presence of vendor specific commands, the process 600 can further analyze the over received commands, especially the read and write commands (block 650). As those skilled in the art are aware, proof of space blockchain activities, specifically Chia activities, have unique read and write command patterns. For example, when plotting data, there are often many write commands but very few read commands. Analyzing data patterns such as these can allow storage devices to identify when proof of space blockchain activities are occurring within one or more memory devices within the memory array (block 655). When no command patterns and no vendor specific commands are present, the process 600 can continue to monitor and parse subsequently received commands (block 630). However, when the analyzed patterns do indicate proof of space blockchain activity, the process 600 can indicate and act upon detected Chia activity. Such actions and processes are outlined in further detail below.

Figure 7:
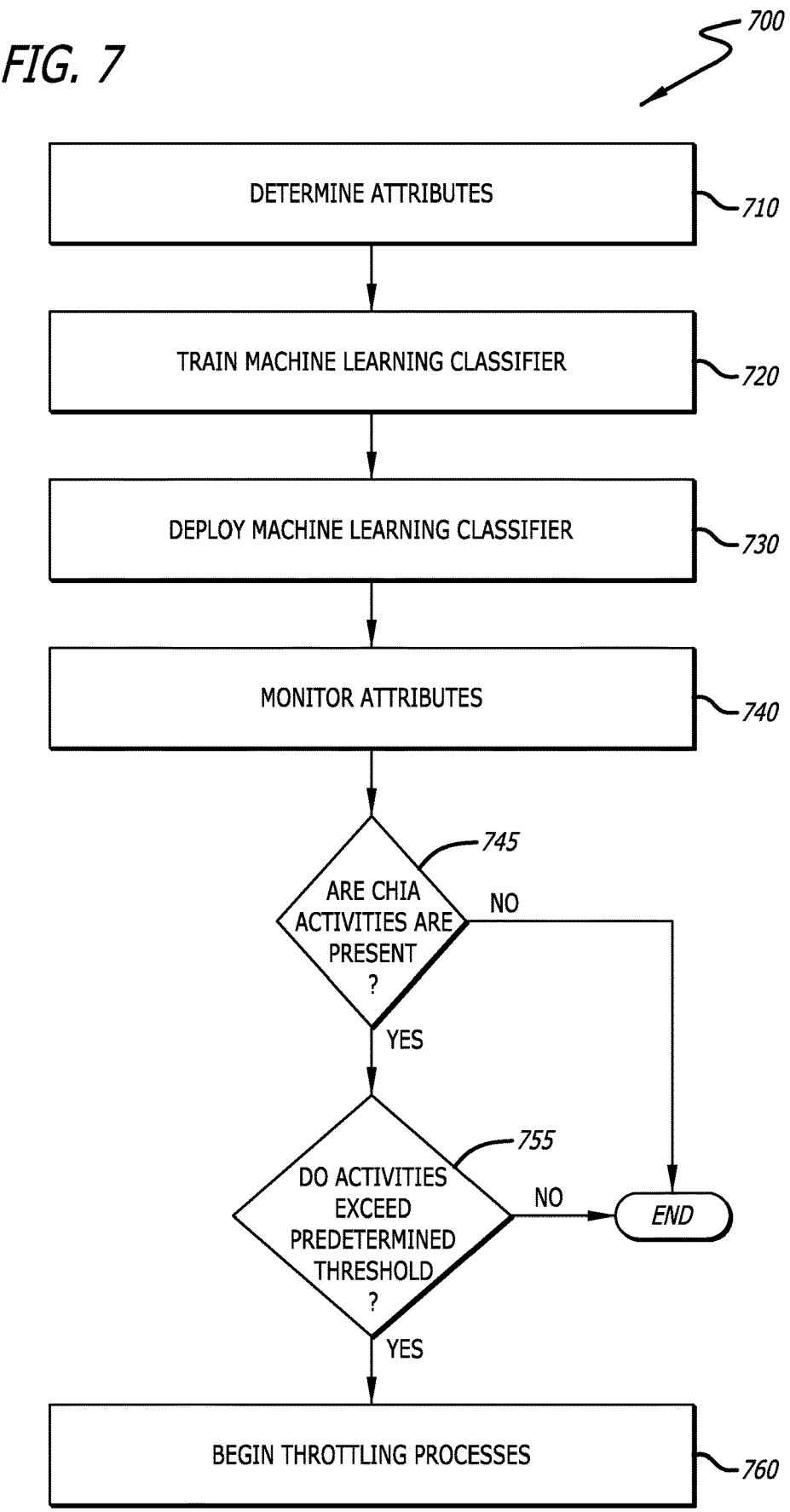
FIG. 7 is a flowchart depicting a process for utilizing a machine learning classifier to detect when throttling processes should occur upon the detection of proof of space blockchain activities in accordance with an embodiment of the disclosure.

Referring to FIG. 7, a flowchart depicting a process 700 for utilizing a machine learning classifier to detect when throttling processes should occur upon the detection of proof of space blockchain activities in accordance with an embodiment of the disclosure is shown. In many embodiments, the process 700 can gather and determine various attributes (block 710). Attributes can be those discussed in the embodiment depicted in FIG. 6 such as, but not limited to, namespace identifications, vendor specific commands, and/or read/write commands. However, additional attributes can be gathered and analyzed to determine proof of space blockchain activity. In various embodiments, attributes can include times of actions, access type (read, write, trim, etc.), logical address, address range, namespace, access size, and various ratios including access size and time, and/or read and write requests. It is contemplated that more attributes may be derived implicitly or explicitly by tracking changes in time during some backwards window and/or by observing relations between these measurements/changes.

In some embodiments, a machine learning classifier will need to be trained (block 720). Often, this is done prior to manufacture of the storage device and is eventually mass deployed on storage devices within a firmware or logic (block 730). In further embodiments, this machine learning classifier may be added to a storage device through a field update such as, but not limited to, a firmware update. In additional embodiments, the machine learning classifier may be installed on one storage device within an array and utilized to analyze multiple storage devices and their activities within the storage device array. Finally, in more embodiments, the training of the machine learning classifier may be done out in the field. Although the embodiment depicted in FIG. 7 depicts training and deploying the machine learning classifier, but other embodiments may omit these steps and instead utilize/activate a preinstalled or updated machine learning classifier.

Once deployed/activated, the process 700 can begin to monitor the determined attributes of the storage device during normal operation (block 740). In some embodiments, only certain attributes may be monitored instead of all of them. Indeed, some attributes may only be useful upon other attributes exceeding some threshold or value. The process 700 can monitor the attributes in order to determine if proof of space blockchain activities, such as Chia plotting activities, are present within the storage device (block 745). The machine learning classifier may make these determinations by utilizing a variety of methods such as, but not limited to, linear classifiers, support vector machines, K-nearest neighbors, decision trees, neural networks, deep neural networks, and/or convolutional neural networks.

In many embodiments, it may be desired to permit a certain level of proof of space blockchain activities to occur. For example, a user may be allowed to generate one Chia plot at a time, but may be throttled when generating multiple Chia plots, either collectively or simultaneously. Thus, when some proof of space blockchain activities are present, the process 700 can determine if those found activities exceed some predetermined threshold (block 755). In some embodiments, the determination may utilize a regression model.

Additionally, an overall accounting of blockchain activities may occur that can also help determine if the current proof of space blockchain activities exceeds the threshold. For example, it is possible for a common user to plot Chia from time to time and that only extensive Chia use will be throttled. In this way, the process 700 may account for the total time spent plotting, the utilized endurance of the memory devices, the power used within the storage device, the total amount of data written, or simply a total amount of plots generated within the storage device. Upon the determination that some threshold was exceeded, the process 700 can begin throttling one or more processes (block 760). These various throttling processes are outlined in more detail below.

Figure 8:
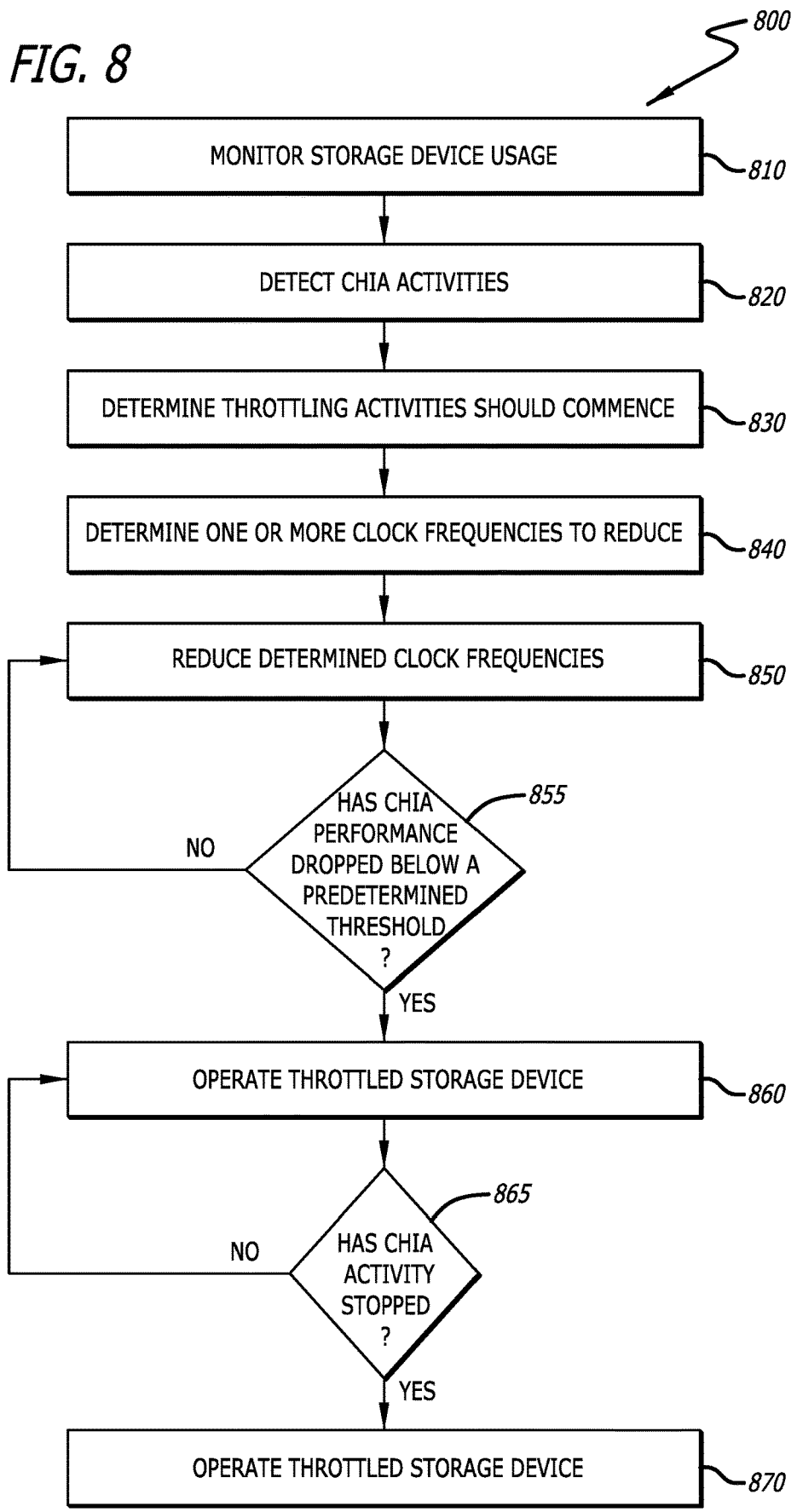
FIG. 8. is a flowchart depicting a process for throttling proof of space blockchain activities by reducing clock frequencies in accordance with an embodiment of the disclosure.

Referring to FIG. 8, a flowchart depicting a process 800 for throttling proof of space blockchain activities by reducing clock frequencies in accordance with an embodiment of the disclosure is shown. During operation of a storage device, the process 800 can monitor the usage of that storage device (block 810). As outlined in more detail within the discussion of FIGS. 6-7, various methods can be utilized to detect proof of space blockchain activities such as Chia activities (block 820). Once detected, the process 800 can determine if throttling activities should commence (block 830). In certain embodiments, storage devices can be configured to begin throttling activities upon the detection of any proof of space blockchain activity. In further embodiments, the process 800 can begin throttling activities upon a certain threshold of proof of space blockchain activities being detected. In this way, the storage device may still perform optimally for casual blockchain miners but can be throttled if more advanced or excessive blockchain mining occurs.

Upon the determination that throttling activities should commence, the process 800 can determine one or more clock frequencies that can be reduced (block 840). In certain embodiments, the controller clock may be reduced. Other clock frequencies that can be reduced include, but are not limited to, memory device (NAND) clocks, die clocks, or other operating clocks. It should be recognized by those skilled in the art that the entire clock may be reduced, or just the clock for certain elements. Additionally, the clock may be reduced by lowering the overall master frequency, or by skipping certain steps within the clock cycle. Once determined or selected, the process 800 can reduce those clock frequencies (block 850).

The process 800 can analyze the current state of the storage device to determine if the proof of space blockchain activities, such as Chia plotting performance, has dropped below a predetermined threshold (block 855). The amount of clock frequency reduction may be variable depending on what operations are currently being performed. The storage device can be configured such that upon throttling, the performance of the proof of space blockchain activity will drop a certain quantifiable amount such as overall drive speed, performance speed, or host command processing speed. When the desired performance hasn't dropped to the predetermined threshold, the process 800 can again reduce the determined clock frequencies (block 850). However, once the performance has dropped sufficiently, the storage device can subsequently be operated in a throttled state (block 860).

Periodically, the process 800 can check whether the proof of space blockchain activities, such as Chia activity, has stopped, or otherwise dropped below a predetermined threshold (block 865). When the proof of space blockchain activity is still occurring, the process 800 can continue to operate the storage device in a throttled state (block 860). However, upon the determination that the proof of space/Chia activity has stopped and throttling activity should cease, the process 800 can restore the determined/selected throttled clock frequencies to their original operational speed (block 870). In some embodiments, the storage device may be configured to operate in a throttle state indefinitely upon triggering of the throttled mode of operation. In additional embodiments, other throttling operations may have been performed and the restoration of the normal clock frequencies is provided, while the other throttling operations are still intact. Additional throttling operations are described below.

Figure 9:
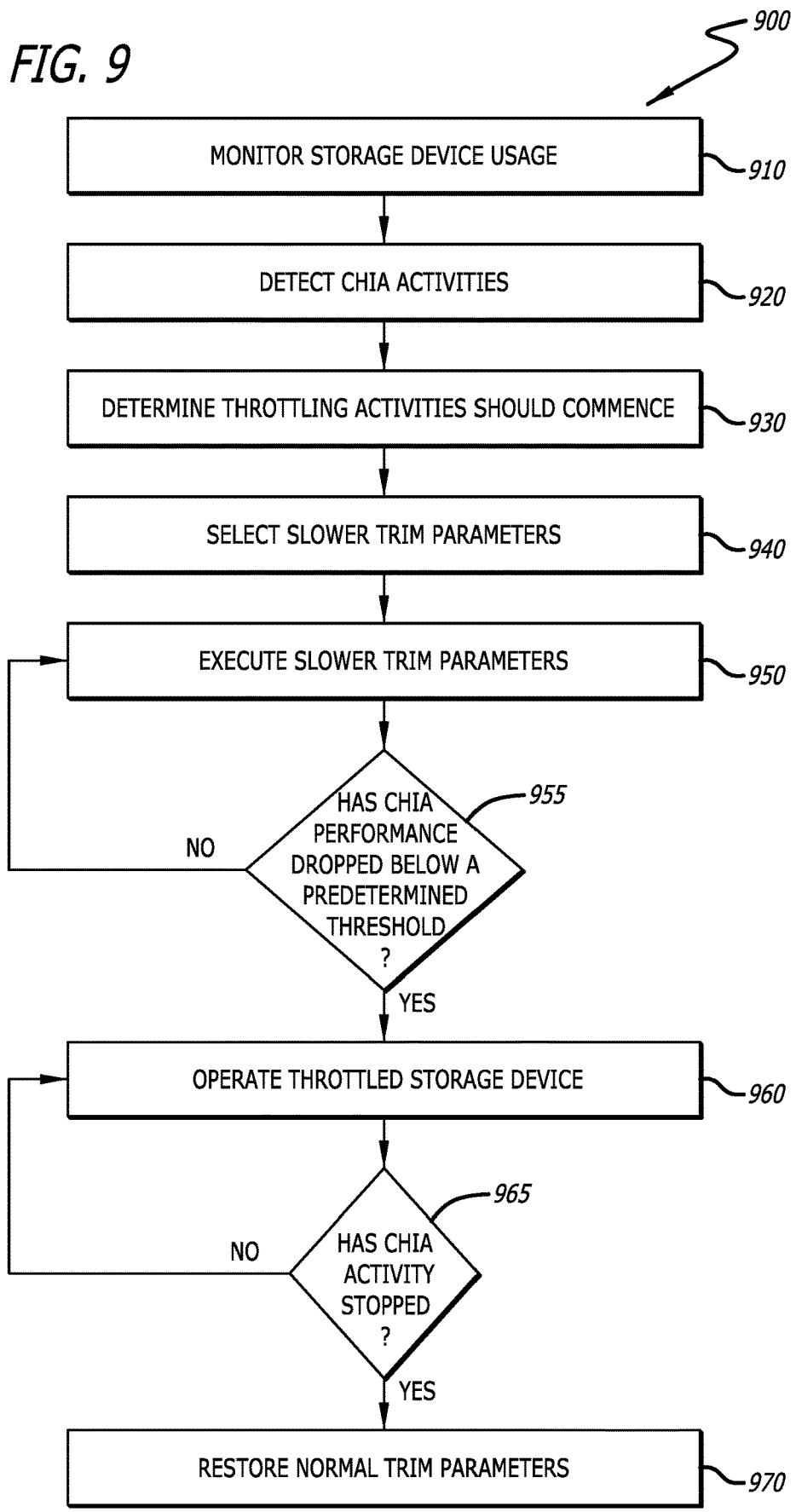
FIG. 9 is a flowchart depicting a process for throttling proof of space blockchain activities by utilizing slower trim operations in accordance with an embodiment of the disclosure.

Referring to FIG. 9, a flowchart depicting a process 900 for throttling proof of space blockchain activities by utilizing slower trim operations in accordance with an embodiment of the disclosure is shown. During operation of a storage device, the process 900 can monitor the usage of that storage device (block 910). Again, as outlined in more detail within the discussion of FIGS. 6-7, various methods can be utilized to detect proof of space blockchain activities such as Chia activities (block 920). Once detected, the process 900 can determine if one or more throttling activities/operations should commence (block 930). In certain embodiments, storage devices can be configured to begin throttling activities upon the detection of any proof of space blockchain activity. In further embodiments, the process 900 can begin throttling activities upon a certain threshold of proof of space blockchain activities being detected. In this way, the storage device may still perform optimally for casual blockchain miners but can be throttled if more advanced or excessive blockchain mining occurs.

Upon the determination that throttling activities should commence, the process 900 can select one or more slower trim parameters (block 940). As those skilled in the art will recognize, "trim" parameters can be understood as a set of parameters that govern the physical aspects of memory device sensing and programming. These trim parameters are typically selected and executed to balance the overall health of the memory devices against the desired performance levels. Temporally slower trim parameters can be selected and/or configured to be more accurate and less stressful on the memory devices, thus increasing or maintaining their overall health. However, the converse of this trim parameter selection is that overall performance is decreased. Once determined or selected, the process 900 can configure or execute those slower trim parameters (block 950).

Similarly, the process 900 can analyze the current state of the storage device to determine if the proof of space blockchain activities, such as Chia plotting performance, has dropped below a predetermined threshold (block 955). The amount of trim parameter setting/configuring may be variable depending on which operations are currently being performed. The storage device can be configured such that upon throttling, the performance of the proof of space blockchain activity will or should drop below a certain quantifiable amount, affecting overall drive speed, performance speed, or host command processing speed. When the desired performance hasn't dropped to the predetermined threshold, the process 900 can again reduce the determined clock frequencies (block 950). However, once the performance has dropped sufficiently, the storage device can subsequently be operated in a throttled state (block 960).

Periodically again, the process 900 can check whether the proof of space blockchain activities, such as Chia activity, has stopped, or otherwise dropped below a predetermined threshold (block 965). When the proof of space blockchain activity is still occurring, the process 900 can continue to operate the storage device in a throttled state (block 960). However, upon the determination that the proof of space/Chia activity has stopped and throttling activity should cease, the process 900 can restore the determined/selected throttled trim parameters to their normal operational settings/configurations (block 970). Again, in some embodiments, the storage device may be configured to operate in a throttle state indefinitely upon triggering of the throttled mode of operation. In additional embodiments, other throttling operations may have been performed and the restoration of the normal clock frequencies is provided, while the other throttling operations are still intact. Another throttling operation is described below.

Figure 10:
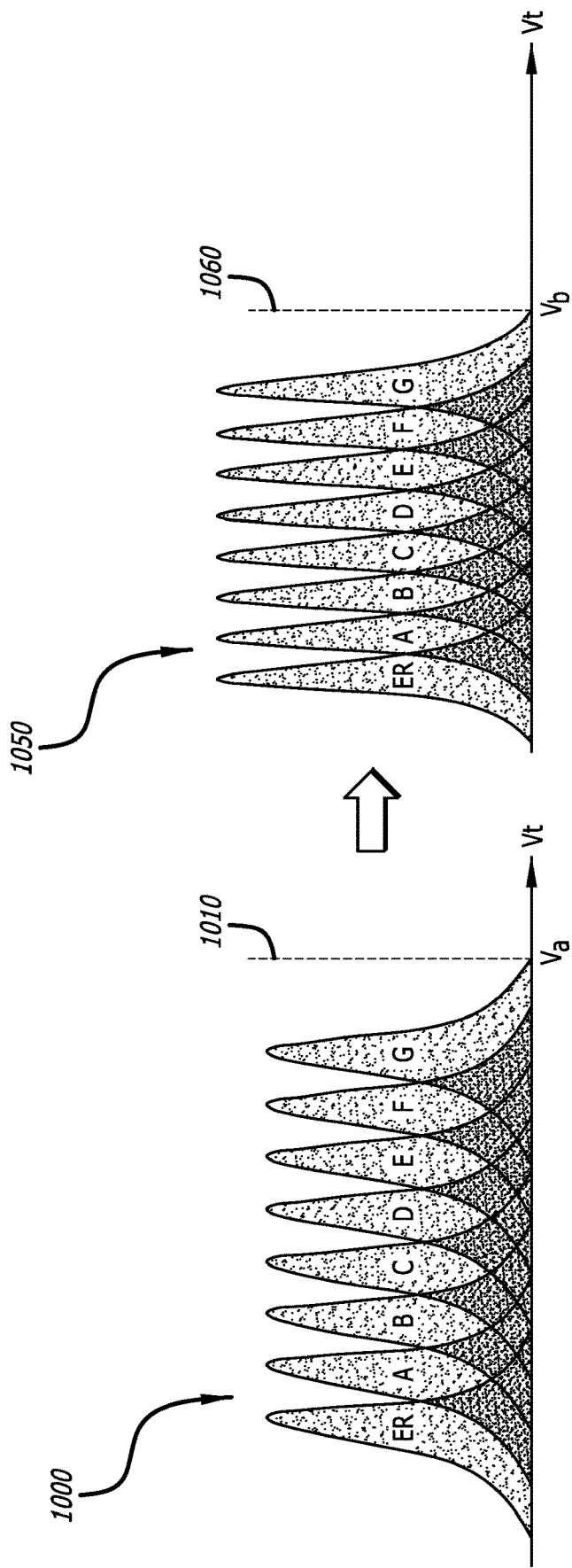
FIG. 10 is a conceptual diagram depicting a standard and reduced voltage window within a programmed memory device in accordance with an embodiment of the disclosure.

Referring to FIG. 10, a conceptual diagram depicting a standard voltage window 1000 and reduced voltage window 1050 within a programmed memory device in accordance with an embodiment of the disclosure is shown. The memory devices shown can be understood as a 3-bit memory device capable of storing eight memory states. Although the embodiments shown in FIG. 10 depict 3-bit TLC memory structures, it is contemplated that subsequently described throttling methods can be applied to quad-level cell ("QLC") and other memory structures with various bit densities per voltage threshold window.

A standard voltage window 1000 illustrates the typical threshold voltage distributions of an 8-state memory array. The possible threshold voltages of each memory device can span a threshold window which is partitioned in this embodiment into eight regions to demarcate respectively eight possible memory states, "Er", "A", "B", "C", "D", "E", "F" and "G". "Er" is a ground state, which is considered an erased state and "A"—"G" are seven progressively programmed states. Each memory state from Er to G indicate an increasingly higher voltage being stored within the memory device. Each memory device can store a range of voltages but can only hold a limited amount of voltage reliably. Typically, the peak voltage that can be programmed into the memory device is one end of the voltage window, with the lowest ground or Er state comprising the other end. In FIG. 10, the standard voltage window 1000 is limited by the high voltage state Va 1010.

However, a reduced voltage window 1050 may be utilized within memory devices. By setting the high voltage state to a reduced high voltage state Vb 1060, the same program states can be programmed within a smaller overall voltage window. By programming memory devices to a reduced voltage window, lower voltages are applied to the cells which results in an operation that is less stressful on the memory devices, which will extend the overall lifespan and health of the memory devices. Additionally, the use of a reduced high voltage state will increase the overlap between state distributions which can result in more memory device errors, which subsequently leads to increased latency for the device to recover the corresponding data. A process to utilize this type of reduced voltage window 1050 is described below.

Referring to FIG. 11, a flowchart depicting a process 1100 for throttling proof of space blockchain activities by programming memory devices with a reduced voltage window in accordance with an embodiment of the disclosure is shown. As described above, during operation of a storage device, the process 1100 can monitor the usage of that storage device (block 1110). This monitoring is outlined in more detail within the discussion of FIGS. 6-7. Various methods can be utilized to detect proof of space blockchain activities such as Chia activities (block 1120). Once detected, the process 1100 can determine if one or more throttling activities/operations should commence (block 1130). In certain embodiments, storage devices can be configured to begin throttling activities upon the detection of any proof of space blockchain activity. In further embodiments, the process 1100 can begin throttling activities upon a certain threshold of proof of space blockchain activities being detected. In this way, the storage device may still perform optimally for casual blockchain miners but can be throttled if more advanced or excessive blockchain mining occurs.

Upon the determination that throttling activities should commence, the process 1100 can select one or more reduced voltage windows (block 1140). As described above in more detail with respect to FIG. 10, the use of a reduced voltage window can both increase the overall health and endurance of the affected memory devices, while also increasing the latency of accessing data stored within the memory devices. Often, this is a result of performing error correction on the reduced voltage window memory devices as they will have a larger proportion of errors compared to regular voltage window programmed memory devices. Once determined or selected, the process 1100 can configure or begin programming memory devices with the reduced voltage window level (block 1150).

Similarly, the process 1100 can analyze the current state of the storage device to determine if the proof of space blockchain activities, such as Chia plotting performance, has dropped below a predetermined threshold (block 1155). The amount of trim parameter setting/configuring may be variable depending on which operations are currently being performed. The storage device can be configured such that upon throttling, the performance of the proof of space blockchain activity will or should drop below a certain quantifiable amount, affecting overall drive speed, performance speed, or host command processing speed. When the desired performance hasn't dropped to the predetermined threshold, the process 1100 can again reduce the determined clock frequencies (block 1150). However, once the performance has dropped sufficiently, the storage device can subsequently be operated in a throttled state (block 1160).

Periodically yet again, the process 1100 can check whether the proof of space blockchain activities, such as Chia activity, has stopped, or otherwise dropped below a predetermined threshold (block 1165). When the proof of space blockchain activity is still occurring, the process 1100 can continue to operate the storage device in a throttled state (block 1160). However, upon the determination that the proof of space/Chia activity has stopped and throttling activity should cease, the process 1100 can resume programming memory devices at the original voltage window level (block 1170). Again, in some embodiments, the storage device may be configured to operate in a throttle state indefinitely upon triggering of the throttled mode of operation. In additional embodiments, other throttling operations may have been performed and the restoration of the normal clock frequencies is provided, while the other throttling operations are still intact. Another throttling operation is described below.

Finally, while various throttling methods have been described above, other methods of throttling are contemplated. For example, other operations such specific performance enhancing features can be disabled upon throttling. These may include, but are not limited to, read look aheads, and/or hot and cold detection, etc. Additionally, embodiments may reduce the overall cache sizes available depending on the configuration of the memory array within the storage device. In some embodiments, memory arrays utilize a large number of single-level cell ("SLC") memory devices to ensure overall drive performance since reading and writing to SLC memory devices is typically much faster than increased level cell memory devices. Furthermore, certain memory arrays may be able to dynamically configure memory devices to operate as either SLC memory device or other higher level memory devices. Therefore, throttling operations may include configuring read or write caches within the memory array to avoid being configured as SLC memory devices such that overall performance is negatively affected.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
a processor;
a memory array comprising:
a plurality of memory devices;
wherein the plurality of memory devices are configurable into one or more namespaces; and
a proof of space throttling logic configured to:
determine that at least a portion of the memory devices are being utilized for one or more proof of space blockchain activities;
select one or more clock frequencies for reduction;
throttle the storage device by reducing the selected clock frequencies for the portion of memory devices being utilized for the one or more proof of space blockchain activities; and
cease throttling the storage device by reinstating, upon a determination that the proof of space blockchain activities have ended, the one or more clock frequencies for the portion of memory devices utilized.

2. The device of claim 1, wherein the at least a portion of the memory devices are configured within a namespace.

3. The device of claim 2, wherein the determination that at least a portion of the memory devices are being utilized for one or more proof of space blockchain activities is based on analyzing the namespace identification data.

4. The device of claim 3, wherein the determination that at least a portion of the memory devices are being utilized for one or more proof of space blockchain activities is in response to the namespace identification data matching namespace identification data previously associated with proof of space blockchain activities.

5. The device of claim 1, wherein the determination that at least a portion of the memory devices are being utilized for one or more proof of space blockchain activities is based on receiving a vendor specific command.

6. The device of claim 1, wherein the determination that at least a portion of the memory devices are being utilized for one or more proof of space blockchain activities is based on analyzing received host commands.

7. The device of claim 6, wherein the analysis of the received host commands includes comparing memory device read and write activities with known proof of space blockchain activity patterns.

8. The device of claim 6, wherein a machine learning classifier is utilized to analyze the received host commands to determine proof of space blockchain activity.

9. The device of claim 8, wherein, the machine learning classifier can analyze other attributes within the storage device to determine proof of space blockchain activity.

10. The device of claim 1, wherein the determination on throttling the storage device is based upon exceeding a predetermined threshold of proof of space throttling activity.

* * * * *